May 2, 1933.  T. P. CHASE  1,906,368

CROSS SHAFT BRACKET

Filed March 15, 1930

Inventor
Theron P. Chase

By Blackmore, Spencer & Hueb-
Attorneys

Patented May 2, 1933

1,906,368

UNITED STATES PATENT OFFICE

THERON P. CHASE, OF DETROIT, MICHIGAN, ASSIGNOR TO GENERAL MOTORS RESEARCH CORPORATION, OF DETROIT, MICHIGAN, A CORPORATION OF DELAWARE

CROSS SHAFT BRACKET

Application filed March 15, 1930. Serial No. 436,077.

This invention relates to brakes for vehicles and is concerned with the hook-up between the pedal, or other operating member, and the brakes functioning to retard the rotation of the front and rear wheels.

An object of the invention is to provide compensation between the front and rear brakes. More specifically it is an object to mount a transverse rock shaft for applying the brakes by means affording an equalizing and centralizing action. Other objects and advantages will be understood from the following description.

In the accompanying drawing—

Figure 1:
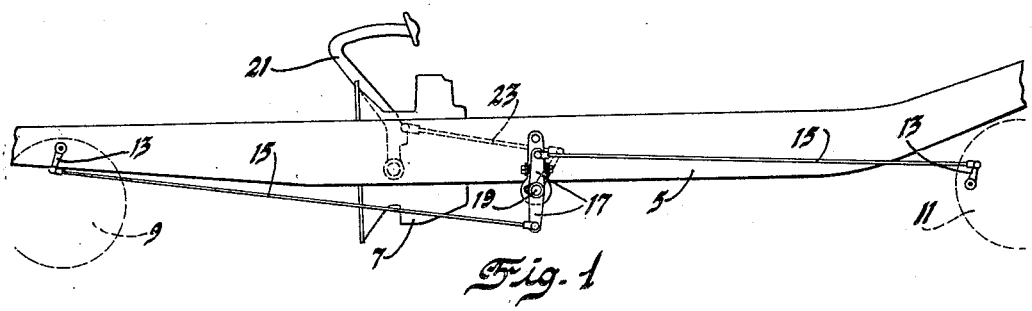
Figure 1 is a view in side elevation.

Referring by reference characters to the drawing numeral 5 is used to designate one of the chasis frame bars of a motor vehicle. Numeral 7 represents the change speed housing. 9 represents one of the front brakes and 11 one of the rear brakes. Each brake is actuated by mechanism within the drum applied by means of a lever arm 13. These lever arms are connected by rods 15 to arms 17 extending in opposite directions from a rock shaft 19, the rock shaft extending transversely across the vehicle. The rotation of shaft 19 is effected by a pedal 21, rotation of which is connected to shaft 19 by a rod 23.

As the pedal is depressed the shaft 19 is rotated and the links 15 swing the levers 13 and apply the brakes at the front end and at the rear end of the vehicle.

Figure 2:
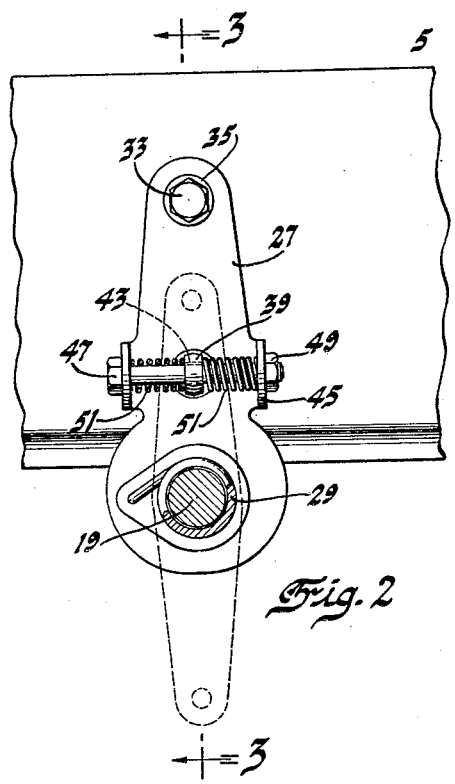
Figure 2 is a view in side elevation of a detail, the view being on line 2—2 of Figure 3.
Figure 3:
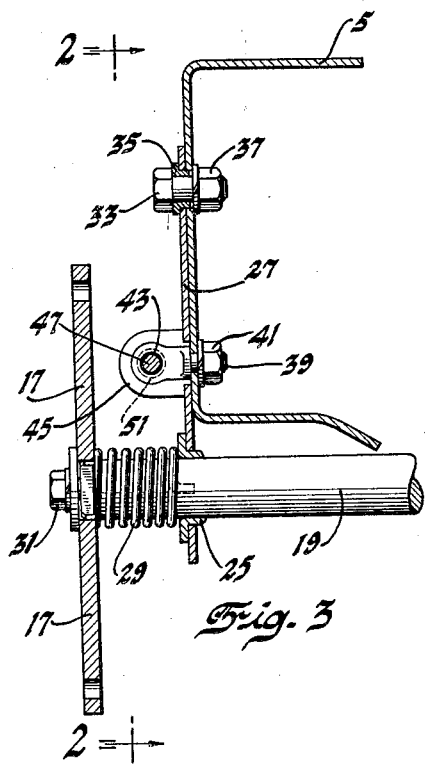
Figure 3 is a transverse section on line 3—3 of Figure 2.

The shaft 19 is rotatably received within bushings 25. These bushings are carried by swinging hangers 27, one of these hangers being mounted on each side of the frame bar as shown in Figures 2 and 3. Positioning springs 29 surround the shaft 19 at each end thereof and are located between the arms 17 and the bushing. Preferably the end of the springs may be extended tangentially and the extremity extended through registering openings in the bushing and hanger 27, thus holding the bushing from rotation in the hanger. A terminal nut 31 may be used to hold the arms 17 in position. A bolt 33 extends through the frame member. It is surrounded by a flanged bushing 35 also extending through the frame aperture, the parts being held in assembled relation by nuts 37. The cylindrical part of the bushing is of sufficient length to rotatably support the hanger 27 as is shown in Figure 3. A second bolt beneath bolt 33 extends through the frame member and is represented by numeral 39. It is held in position by a nut 41. This bolt 39 is apertured as shown at 43 and the hanger 27 has ears 45 with openings aligned with the opening in the head of the bolt 39. Extending through the several apertures is a bolt 47 secured in position by a nut 49. Surrounding this bolt 47 are springs 51. These springs at their adjacent ends abut opposite sides of the bolt 39 and their remote ends engage the ears 45.

Since the shaft 19 is free to swing bodily about pivots 33, it may move slightly forwardly or rearwardly against the resilient resistance offered by one or the other of springs 51 in the act of compensating for unequal resistance at the brakes. Such movement of the shaft is desirable to compensate for lack of equality in the clearance of the brakes front and rear. It also compensates for any difference in front and rear axle roll under braking stress. Should any one of the rods 15 fail the yielding of the springs prevents the locking of the remaining active brake. The construction is simple and provides all necessary compensation in constructions where the older type of equalizers is omitted and where reliance is placed upon a simple form of adjustment adjacent each individual brake.

I claim:

1. In a brake system, brakes, a rock shaft between said brakes, means connecting said rock shaft to said brakes, means to rock said shaft, swinging means to support said shaft, a member fixed in position relative to said swinging member and independent resilient means operably associated with said fixed member and swinging means to resist swinging of said swinging means in either direction.

2. In a brake system for vehicles, side frame bars, front and rear brakes, a rock shaft between said brakes, swinging means pivotally supporting said rock shaft on said frame bars, resilient means operable between said frame bar and said swinging means to resist swinging of said swinging means and to restore said swinging means after brake application.

3. In a brake system for vehicles, side frame bars, brakes, a transverse rock shaft, connections between said rock shaft and brakes, swinging means pivoted to one of said frame bars, and carrying said rock shaft, said swinging means having ears, an abutment carried by said frame bar, a spring between each ear and said abutment, and means to rock said shaft.

In testimony whereof I affix my signature.

THERON P. CHASE.